United States Patent [19]

Siclari

[11] 4,150,459
[45] Apr. 24, 1979

[54] MEATBALL MAKER

[76] Inventor: Anthony Siclari, 1261 E. 57th St., Brooklyn, N.Y. 11234

[21] Appl. No.: 798,631

[22] Filed: May 19, 1977

[51] Int. Cl.² .......................................... A22C 7/00
[52] U.S. Cl. ...................................... 17/32; 425/279
[58] Field of Search ................. 17/32; 425/276, 277, 425/278, 279, 280, 281, 282, 283, 284, 285, 286

[56] References Cited

U.S. PATENT DOCUMENTS

| 961,429 | 6/1910 | Clark | 425/224 |
| 977,382 | 11/1910 | Geier | 425/284 |
| 1,224,007 | 4/1917 | Moos | 425/278 |
| 1,253,057 | 1/1918 | Larrowo et al. | 425/281 |
| 1,271,327 | 7/1918 | Klugiewicz | 425/278 |
| 1,320,885 | 11/1919 | Melick | 425/285 |
| 1,480,398 | 1/1924 | Kirchhoff | 425/278 |
| 1,485,273 | 2/1924 | Kleintop | 425/283 |
| 1,540,089 | 6/1925 | Schmelter | 425/283 |
| 1,584,757 | 5/1926 | Dow | 425/278 |
| 1,732,328 | 10/1929 | Cox | 425/284 |
| 2,157,813 | 5/1939 | Biskup | 425/278 |
| 2,238,150 | 4/1941 | Aquara et al. | 425/278 |
| 2,605,498 | 8/1952 | Manton | 425/284 |
| 2,803,458 | 8/1957 | Holly | 17/32 |
| 2,949,629 | 8/1960 | Falco | 425/278 |

Primary Examiner—Russell R. Kinsey
Assistant Examiner—Paul J. Hirsch

[57] ABSTRACT

A device for forming meat balls, consisting primarily of a pair of scoop members rotatable within a stationary outer scoop secured to the base and having a sliding rack in engagement with a gear cooperating with a set of gears connected to the scoop members.

5 Claims, 3 Drawing Figures

U.S. Patent  Apr. 24, 1979  4,150,459
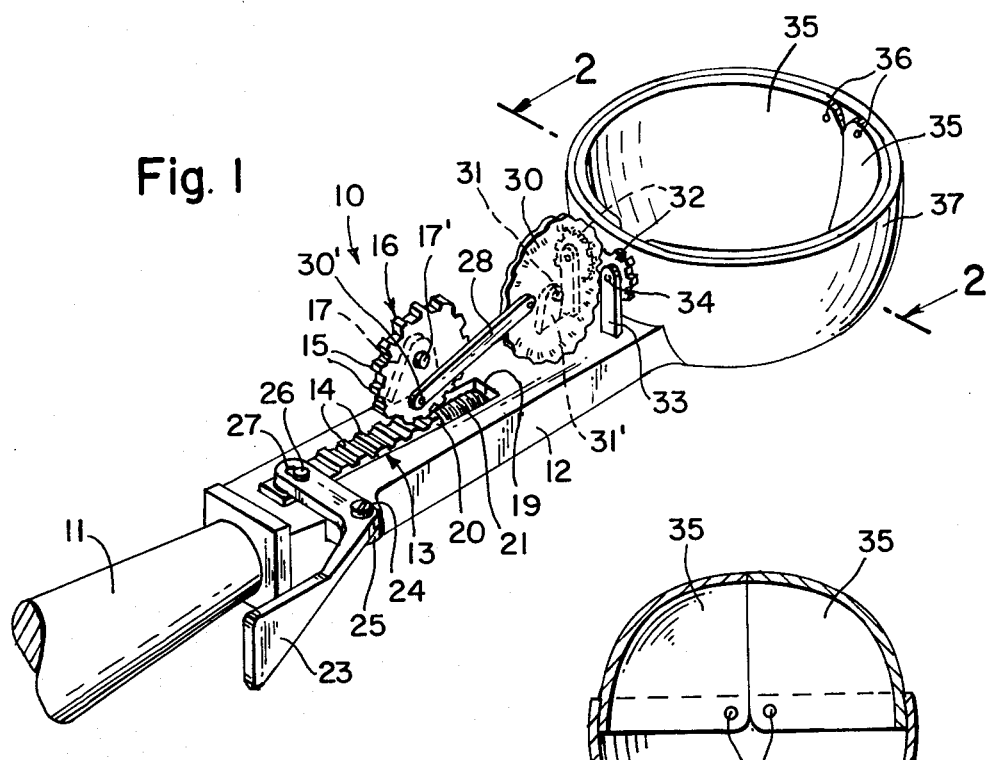
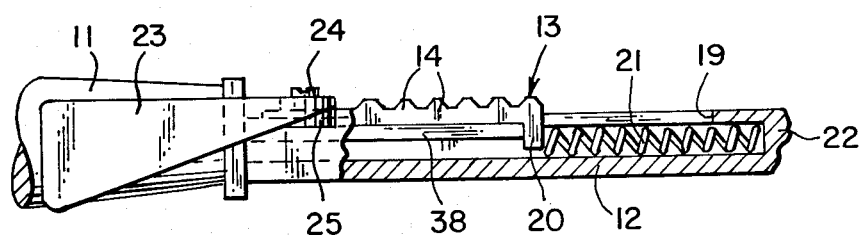

MEATBALL MAKER

This application is a substitute application for patent application Ser. No. 188,710 filed 3/28/72 and now abandoned.

This invention relates to kitchen devices, and more particularly to a meat ball making device.

It is therefore the principal object of this invention to provide a meat ball making device which will enable housewives and cooks to form meat balls uniformly and in a fraction of the time normally required to form meat balls by hand.

Another object of this invention is to provide a device which will have a stationary and hollow member which will have a pair of rotatable inner scoop members which when rotated by a pivotable member upon the body of the device, will form the meat ball and the meat ball formed therein, will be released by the inner scoop members rotating to the full open position, by spring means carried within the base of the device.

A further object of this invention is to provide a device of the type described, which will have spring means for returning the rack member to its normal position so as to enable the scoop portion of the device, to have meat entered therein.

Other objects of the invention are to provide a meat ball forming device which is simple in design, inexpensive to manufacture, rugged in construction, easy to use and efficient in operation.

The prior art of record in the parent application to this application include U.S. Pat. Nos. 953,901 to A. J. Daniel and 1,699,914 to P. A. J. Peasson. Neither of these references provide the sliding rack and cooperating gears and gear driven inner scoop members of this application.

BRIEF DESCRIPTION OF THE DRAWINGS

The invention can be more fully understood by reference to the following description in view of the accompanying drawings, in which:

FIG. 1 is a perspective view of the device showing some of the features in phantom.

FIG. 2 is a cross-sectional view taken along the line 2—2 of FIG. 1.

FIG. 3 is a side view in partial section of the device seen in FIG. 1.

Referring now to FIGS. 1, 2, and 3, one will see the device 10 having a handle portion 11 from which extends a base 12. A sliding rack 13 having a plurality of teeth 14 for engagement with teeth 15 of gear 16 which is supported within bracket 17, provides for the operation of device 10 in a manner which herein a after will be described. Gear 16 is pivotably carried within bracket 17 by means of a pin 17', the bracket 37 being fixedly secured in a suitable manner to the top of the base 12. Rack 13 is slidable within opening 19 through the surface of base 12 and a projection 20 of rack 13 urges against one end of a spring 21, the opposite end of spring 41 urging the wall 22 within base 12. The spring 21 serves as return means for rack 13 after a meat ball has been formed by device 10. The lever 23 for moving rack 13, forward, is pivotably secured by a screw fastener 24, to projection 25 extending from the side of base 12. A pin 26 fixedly secured to the top of rack 13 is slidably carried within elongated opening 27 so as to enable rack 13 to be urged forward when pressure is applied to projecting lever 23. A connecting rod 28 is carried off-set upon gear 16 and gear 30 and is pinned thereto by means of a pair of pins 30'. Circular gear 30 is secured by means of pin 31, to an extending lug 31' fixedly secured to base 12 and gear 30 when rotated, will simultaneously rotate the pair of gears which are supported upon lugs 33 secured to base 12. The gears 32 are carried upon pins 34 which causes a pair of inner scoop members 35 to pivot on pins 34 and 36 to a closed position as shown in FIG. 2 of the drawings.

The outer scoop 37 of device 10, is fixedly secured to base 12 so as to remain stationary to form a meat ball when the mix is received within the scoop area.

When the user grasps handle 11 and urges against lever 23, the lever when pivoted, causes rack 13 to be moved forward within the slot 19 of base 12 and when doing so, the rack 13 rotates gear 16 which will rotate gear 30 by means of the connecting rod 28. When the formation occurs, the gears 32 are simultaneously rotated so as to cause the inner scoop members 35 to close together and form a meat ball, the meat ball being released from device 10 by inverting the scoop portion and releasing the lever 23. When lever 23 is released, the spring 21 urges rack 13 rearwards and thus causes the gear train to pivot the inner scoop members 35 to the open position, thus releasing the meat ball formed therein.

It shall be noted that rack 13 is supported upon a pair of spaced apart rails 38 on the interior of base 12.

It may thus be seen that objects set forth above may be attained from the preceeding description but since certain changes may be made in the above embodiment without departing from the spirit or scope of the invention, it is intended that all matter contained in the above description and shown in the accompanying drawings shall be interpreted as illustrative and not in a limiting sense.

It is also to be understood that the following claims are intended to cover all the generic and specific features of the invention as herein described as well as any statements of the scope of the invention which may fall there-between.

What I claim is:

1. A meat ball making device, comprising:
   a base,
   a handle portion attached to a proximal end of the base,
   an outer scoop attached to a distal end of the base,
   a pair of inner scoop members pivotally attached to the outer scoop,
   means of pivoting the inner scoop members attached to the inner scoop members and attached to the base,
   a pin attached to a proximal portion of each of the inner scoop members and passing through the outer scoop,
   a gear attached to a proximal end of each of the pins passing through the outer scoop,
   a central vertical circular gear engageable with each of the gears attached to each of the inner scoop members, and
   means of driving the central vertical gear attached to the base.

2. The meat ball making device of claim 1, further comprising:
   a connecting rod attached at an off set position to the central vertical gear,
   the central vertical gear rotatably supported on the base, another end of the connecting rod offsettedly connected to a tooth gear, the tooth gear rotatably supported on the base, the tooth gear engageable with a toothed rack, the toothed rack slidingly mounted in the base, and means of slidingly moving the rack attached to the base.

3. The meat ball making device of claim 2, wherein the rack is supported on a rail mounted in an opening in the base, means of yieldably constraining the rack in a proximal portion of the opening mounted in the opening, and a lever mounted on the base and engageable with the rack to slidingly move the rack in the opening on the rails.

4. The device of claim 3, wherein the means of yieldably constraining the rack is a spring proximally engaging the rack and distally pressing against a wall in the base.

5. A meat ball making device, comprising:

a base, a handle portion attached to a proximal end of the base, an outer scoop attached to a distal end of the base, a pair of inner scoop members pivotally attached to the outer scoop, means of pivoting the inner scoop members attached to the inner scoop members and attached to the base, a pin attached to a proximal portion of each of the inner scoop members and passing through the outer scoop, a gear attached to a proximal end of each of the pins passing through the outer scoop, a central vertical circular gear engageable with each of the gears attached to each of the inner scoop members, means of driving the central vertical gear attached to the base, a connecting rod attached at an offset position to the central vertical gear rotatably supported on the base, another end of the connecting rod offsettedly connected to a tooth gear, the tooth gear rotatably supported on the base, the tooth gear engageable with a toothed rack, the toothed rack slidingly mounted in the base, means of slidingly moving the rack attached to the base, the rack supported on a rail mounted in an opening in the base, a lever mounted on the base and engageable with the rack to slidingly move the rack in the opening on the rails, a spring proximally engaging the rack and distally pressing against a wall in the base, and a pin attached to a proximal end of the rack slidingly moving in an elongated opening in a distal end of the lever, whereby pivotation of the lever can cause linear sliding movement of the rack thereby causing rotation of the toothed gear which is translated by the connecting rod to cause rotation of the central vertical gear which in turn rotates the gears attached to the inner scoop members.

* * * * *